UNITED STATES PATENT OFFICE.

ALBERT HEINEMANN, OF BERLIN-WILMERSDORF, GERMANY.

PROCESS OF PRODUCING MALTED PEARL-BARLEY.

1,400,160. Specification of Letters Patent. Patented Dec. 13, 1921.

No Drawing. Application filed July 22, 1921. Serial No. 486,852.

*To all whom it may concern:*

Be it known that I, ALBERT HEINEMANN, a citizen of the German Republic, residing at Berlin-Wilmersdorf, Germany, have invented certain new and useful Improvements in a Process for Producing Malted Pearl-Barley, (for which I have filed applications in Germany April 24, 1917, and Oct. 3, 1919,) of which the following is a specification.

The invention relates to a process for producing malted pearl-barley and at the same time obtaining malted bran.

The object of the invention is the production of a novel kind of pearl-barley and also of a novel kind of bran produced during the manufacture.

In the manufacture of pearl-barley from common barley as hitherto practised the barley is hulled without having undergone any preparatory treatment, so that the pearl-barley (semolina) is put on the market in its raw state. The bran forming a by-product is used as cattle-food, so that valuable parts of the barley are lost for human food, particularly the aleuron matter which is rich in proteids, the fatty germ and according to the size of the grains of pearl-barley smaller or larger portions of the kernel itself.

According to my invention a pearl-barley is produced which is far superior to the same article obtained by the known processes, while the bran formed as a by-product is partially suitable for human food. In carrying out the process according to this invention the barley is cleaned in the usual manned and then steeped in water till it swells up and begins to germinate. The water is then drawn off and the barley conveyed to a suitable drying apparatus, where it is subjected to a preliminary drying until its content of water is reduced to approximately that of the grain and then baked in a kiln at a moderate temperature, whereby the germination is arrested. This treatment also aims in the first place at opening up the aleuron cells and to disclose the valuable contents of the cells, the albuminous substances, fats and proteid matters and nutritious salts, and to make them capable of being assimilated as human food. By the steeping and the incomplete germination, an enzymatic action takes place owing to which the firmly closed cells (membranes) of the gluten cell layer (aleuron cells) are opened, while the subsequent kiln-drying preserves the valuable contents for any length of time from deterioration. After grinding this portion of the broken up barley—corn is made available for the human digestive organs and capable of being utilized as a food. The thus treated malt-barley, which forms a kind of malt not completely dissolved is now peeled in a mill or the like of well known construction to obtain the pearl-barley. From the bran formed as a by-product, which contains the aleuron matter, the germ and larger or smaller quantities of flour, malt flour, malt groats or the like are sifted off, while the residue of the bran forms a valuable cattle-food.

The above described process is preferably carried out in malt-houses. The incomplete germination can suitably take place directly in the steeping vat or on the malt floor or in germination drums. According to this invention the germination is interrupted at the time when the diastase formed during the germination merely dissolves the starch of the outer layer of the flour kernel, while the inner portion of the kernel is only slightly affected by the action of the diastase. During the germination and the preliminary drying the outer portions of the flour of the grain, upon which the diastase has acted, have been converted into sugar, exactly as in the manufacture of malt. The maltster has it in his power to determine the duration of this preparatory treatment, that is of the germination and the preliminary drying, in order to carry through the action of the diastase and the conversion into sugar depending upon it, according to the size of the pearl-barley to be produced by the peeling of the grain. Hereby the result is obtained that the inner portion of the grain intended for the pearl-barley is less acted upon, so that it possesses sufficient hardness after the kiln-drying in order to offer the required resistance during the peeling for the manufacture of the pearl-barley.

When the material comes from the drying kiln, it is peeled or hulled in mills or peeling machines in the well known manner, whereby the waste can be sifted or screened, as above described, to obtain a high value food flour suitable for soups or as an addition to cocoa, milk-powder and the like, while the residue forms a bran, which with its parts rich in proteids forms a valuable food for cattle, calves and pigs. The entire residue containing the flour may however also be employed as malt rich in extracts for brewing purposes, as well as for the manufacture of malt extract and the like.

The pearl-barley produced in the above manner has obtained the properties of a malt substance, owing to the action of the diastase and above all by the dissolved starch and the kiln drying and compared with the pearl-barley and semolina from raw barley now on the market possesses the great advantage that it has lost the raw fruit taste in consequence of the described treatment, so that when used as food it requires no other seasoning, than salt or butter. It is capable of swelling up considerably, can easily and completely be assimilated so that it has a considerably higher value as a food than the hitherto used raw pearl-barley and semolina and above all may be completely cooked in a very short time. Finally the thus prepared malt-semolina may be worked into malt flakes as breakfast food and the like.

It will be obvious that the process may be varied in its details without departing from the spirit or sacrificing any of the advantages of the invention.

What I claim as my invention is:

1. The herein described process of treating barley, which consists in steeping the barley until it swells and germination commences, thereupon subjecting the barley to a preliminary drying action to interrupt the germination or a stage where the diastase produced by germination has converted only the outer starch portion of the kernel beneath the husk into sugar, completing the drying of the barley, and finally peeling the treated barley to obtain pearl barley.

2. In the herein described process of treating barley, in combination with the steps enumerated in claim 1, the step of sifting the peelings of the treated barley.

In testimony whereof I affix my signature in presence of two witnesses.

ALBERT HEINEMANN.

Witnesses:
 GEORGE RIEBIG,
 SIEGFRIED HAMBURGER.